United States Patent
Agrawal et al.

(10) Patent No.: US 10,691,700 B1
(45) Date of Patent: Jun. 23, 2020

(54) TABLE REPLICA ALLOCATION IN A REPLICATED STORAGE SYSTEM

(71) Applicant: Uber Technologies, Inc., San Francisco, CA (US)

(72) Inventors: Ritesh Agrawal, Pleasanton, CA (US); Kevin Novak, San Francisco, CA (US); Jai Ranganathan, San Francisco, CA (US); Tristan Willy, San Bruno, CA (US); David Nguyen, Daly City, CA (US)

(73) Assignee: Uber Technologies, Inc., San Francisco, CA (US)

( * ) Notice: Subject to any disclaimer, the term of this patent is extended or adjusted under 35 U.S.C. 154(b) by 722 days.

(21) Appl. No.: 15/396,290

(22) Filed: Dec. 30, 2016

(51) Int. Cl.
*G06F 11/34* (2006.01)
*G06F 16/22* (2019.01)
*G06F 16/2457* (2019.01)
*G06F 16/23* (2019.01)

(52) U.S. Cl.
CPC ........ *G06F 16/24578* (2019.01); *G06F 16/23* (2019.01)

(58) Field of Classification Search
CPC ........ G06F 17/30867; G06F 17/30675; G06Q 30/02
USPC .......................................................... 707/751
See application file for complete search history.

(56) References Cited

U.S. PATENT DOCUMENTS

| | | | | |
|---|---|---|---|---|
| 6,374,251 B1 * | 4/2002 | Fayyad | .................... | G06F 16/35 |
| 7,984,151 B1 * | 7/2011 | Raz | ....................... | G06F 9/5083 709/223 |
| 2012/0109936 A1 * | 5/2012 | Zhang | ................. | G06F 11/3485 707/713 |
| 2013/0166752 A1 * | 6/2013 | Kim | ....................... | G06F 9/5061 709/226 |
| 2015/0347559 A1 * | 12/2015 | Elias | ................... | G06F 16/9024 707/737 |

OTHER PUBLICATIONS

Hababeh et al. "A hihg-performance computing method for data allocation in distributed database systems", Jan. 2007 The Journal of Supercomputing vol. 39, Issue 1, pp. 3-18 (Year: 2007).*

(Continued)

*Primary Examiner* — Hosain T Alam
*Assistant Examiner* — Robert F May
(74) *Attorney, Agent, or Firm* — Fenwick & West LLP (57) ABSTRACT

A replicated storage system allocates tables to storage clusters to balance the usage of resources in the replicated storage system. The replicated storage system determines the query load of the stored tables and generates candidate table allocations based on the query loads. The candidate table allocations are generated based on table allocation criteria based on the popularity of the tables or whether the tables are related to other tables. The replicated storage system determines resource parameters for each candidate table allocation and generates a resource usage score for each candidate table allocation based on a utility function that is weighted based on priorities of the resources used by the replicated storage system. The replicated storage system selects a table allocation from the candidate table allocations based on the resource usage scores of the candidate table allocations and allocates table replicas to the storage clusters.

20 Claims, 5 Drawing Sheets

(56) References Cited

OTHER PUBLICATIONS

Cheng, C. et al., "Genetic algorithm-based clustering approach for database partitioning," IEEE Transactions on Systems, Man, and Cybernetics, 2002, vol. 32(3), pp. 215-230.

Du, J. et al., "Genetic algorithms based approach to database vertical partitioning," Journal of Intelligent Information Systems, 2006, vol. 26(2), pp. 167-183.

Gu, X. et al., "Practically realizable efficient data allocation and replication strategies for distributed databases with buffer constraints", IEEE Transactions on Parallel and Distributed Systems, 2006, vol. 17, issue 9, pp. 1001-1013.

Hababeh, I. et al., "A high-performance computing method for data allocation in distributed database systems", Journal of Supercomputing, 2007, vol. 39, issue 1, pp. 3-18.

Johansson, J. et al., "Modeling network latency and parallel processing in distributed database design," Decision Sciences, 2003, vol. 34(4), pp. 677-706.

Kossmann, D. "The state of the art in distributed query processing," ACM Computing Surveys, 2000, vol. 32(4), pp. 422-469.

Li, B. et al., "A novel stochastic opitimizationalgorirhm," IEEE Transactionn on Systems, Man, and Cybernetics: Part B, 2000, vol. 30 Issue 1, pp. 191-198.

Michalewicz, Z. et al., How to Solve It: Modern Heuristics, Table of Contents, 2nd edition, Springer, Berlin, 2004, 8 pages.

Sevince, E. et al., "An evolutionary genetic algorithm for optimization of distributed database queries," Computer Journal, 2011, vol. 54 Issue 5, pp. 717-725.

Song, S. et al., "Genetic algorithm for vertical fragmentation and access path selection," Computer Journal, 2000, vol. 43 Issue 1, pp. 81-93.

Song, S. "Design of distributed database systems: an iterative genetic algorithm," Journal of Intelligent Information Systems, Journal of Intelligent Information Systems, 2015, vol. 45, No. 1, pp. 29-59.

Verma, A. et al., "Reliability-based optimal task-allocation in distributed database management systems," IEEE Transactions on Reliability, 1997, vol. 46 Issue 4, pp. 452-459.

Wang, J. et al., "A near-optimal database allocation and replication strategies for distributed databases with buffer constraints," Information Sciences, 2009, vol. 179 Issue 21, pp. 3772-3790.

Agrawal, R. et al., Automating Layout of Relational Databases. In ICDE, 2003, pp. 607-618.

Ahmad, I. et al., Evolutionary Algorithms for Allocating Data in Distributed Database Systems. Distributed and Parallel Databases, 2002, pp. 5-32, 11(1).

Alba, A. et al., A Funny Thing Happened on theWay to a Billion . . . IEEE Data Engineering Bulletin, 2006, pp. 27-36, 31(4).

Alsberg, P. A. et al., A Principle for Resilient Sharing of Distributed Resources. In ICSE, 1976 pp. 562-570.

Amdahl, G. M., Validity of the Single Processor Approach to Achieving Large Scale Computing Capabilities. In AFIPS, 1967, pp. 483-485.

Amossen, R. R., Vertical Partitioning of Relational OLTP Databases Using Integer Programming. In ICDEW, 2010, pp. 93-98.

Amza, C. et al., Distributed Versioning: Consistent Replication for Scaling Back-End Databases of Dynamic ContentWeb Sites. In Middleware 2003, pp. 282-304. Springer Berlin Heidelberg.

Apers, P. M. G., Data Allocation in Distributed Database Systems. ACM Transactions on Database Systems, 1988, pp. 263-304, 13(3).

Barroso, L. A. et al., The Case for Engergy-Proportional Computing. IEEE Computer, 2007, pp. 33-37, 40(12).

Bhattacharjee, B. et al., Storage Class Memory Aware Data Management. IEEE Data Engineering Bulletin, 2010, pp. 35-40, 33(4).

Borodin, A. et al., Online Computation and Competitive Analysis. Cambridge University Press, 1998, 218 pages.

Burkard, R. M. et al., Assignment Problems. Table of Contents, Society for Industrial and Applied Mathematics, 2009, 7 pages.

Calder, B. et al., Cache-Conscious Data Placement. SIGOPS Operation System Review, 1998, pp. 139-149, 32(5).

Canim, M. et al., An Object Placement Advisor for DB2 Using Solid State Storage. PVLDB, 2009, pp. 1318-1329, 2(2).

Cecchet, E., RAIDb: Redundant Array of Inexpensive Databases. In ISPA, 2004, pp. 115-125.

Cecchet, E. et al., C-JDBC: Flexible Database Clustering Middleware. In USENIX, 2004.

Ceri, S. A. et al., Horizontal Data Partitioning in Database Design. In SIGMOD, 1982, pp. 128-136.

Coffman, E. G. et al., Approximation Algorithms for Bin Packing: A Survey. In D. S. Hochbaum, editor, Approximation Algorithms for NP-Hard Problems, chapter 2. PWS Publishing Company, 1996.

Copeland, G. et al., Data Placement in Bubba. SIGMOD Record, 1988, pp. 99-108, 17(3).

Curino, C. et al., Schism: A Workload-Driven Approach to Database Replication and Partitioning. PVLDB, 2010, pp. 48-57, 3(1-2).

Dean, J. et al., MapReduce: Simplified Data Processing on Large Clusters. CACM, 2008, pp. 107-113, 51(1).

Dewitt, D. J. et al., GAMMA—A High Performance Dataflow Database Machine. In VLDB, 1986, pp. 228-237.

Elnikety, S. et al., Tashkent: Uniting Durability with Transaction Ordering for High-Performance Scalable Database Replication. In SIGOPS/EuroSys, 2006, pp. 117-130.

Elnikety, S. et al., Tashkent+: Memory-Aware Load Balancing and Update Filtering in Replicated Databases. In EuroSys, 2007, pp. 399-412.

Englert, S. et al., A Benchmark of NonStop SQL Release 2 Demonstrating Near-Linear Speedup and Scaleup on Large Databases. Technical Report 89.4, Tandem Computers Inc., 1989.

Ganesan, P. et al., Online Balancing of Range-Partitioned Data with Applications to Peer-to-Peer Systems, In VLDB, 2004 pp. 444-455.

Gray, J., Why Do Computers Stop and What Can be Done About It? Technical Report 85.7, Tandem Computers, 1985.

Hauglid, J. O. et al., DYFRAM: Dynamic Fragmentation and Replica Management in Distributed Database Systems. Distributed and Parallel Databases, 2010, pp. 157-185, 28(2).

Helal, A. A. et al., Replication Techniques in Distributed Systems. Springer, 1996, 88 pages.

Hellerstein, J. M. et al., Architecture of a Database System. Foundations and Trends in Databases, 2007, pp. 141-259, 1(2).

Kemme, B. et al., Don't Be Lazy, Be Consistent: Postgres-R, A New Way to Implement Database Replication. In VLDB, 2000, pp. 134-143.

Kuhn, H.W., The Hungarian Method for the Assignment Problem. Naval Research Logistic, 2005, pp. 7-21, 52(1).

Ladin, R. et al., Providing High Availability Using Lazy Replication. ACM Transactions on Computer Systems, 1992, pp. 360-391, 10.

Lakshman, A. et al. Cassandra: a decentralized structured storage system. SIGOPS Operating Systems Review, 2010, pp. 35-40, 44(2).

Leverich, J. et al., On the Energy (In)efficiency of Hadoop Clusters. In HotPower, New York, NY, USA, ACM, 2009.

Li, J. et al., Resource Bricolage for Parallel Database Systems. PVLDB, 2014, pp. 25-36, 8.

Milan-Franco, J. M. R. et al., Adaptive Middleware for Data Replication. In Middleware, 2004, pp. 175-194.

Moscato, P., On Evolution, Search, Optimization, Genetic Algorithms and Martial Arts: Towards Memetic Algorithms. Technical Report Caltech Concurrent Computation Program 158-79, California Institute of Technology, Pasadena, CA, USA, 1989.

Munkres, J., Algorithms for the Assignment and Transportation Problems. Journal of the Society of Industrial and Applied Mathematics, 1957, pp. 32-38, 5(1).

Ozmen, O. et al., Aware Storage Layout for Database Systems. In SIGMOD, 2010, pp. 939-950.

Özsu, T. et al., Principles of Distributed Database Systems, Third Edition. Springer New York, Upper Saddle River, NJ, USA, 2011, 435 pages.

Papadomanolakis, S.et al., Efficient Use of the Query Optimizer for Automated Physical Design. In VLDB, VLDB Endowment, 2007, pp. 1093-1104.

(56) References Cited

OTHER PUBLICATIONS

Patino-Martinez, M., et al., MIDDLE-R: Consistent Database Replication at the Middleware Level. ACM Transactions on Computer Systems, 2005, pp. 375-423, 23(4).

Pavlo, A. et al., Skew-aware Automatic Database Partitioning in Shared-nothing, Parallel OLTP Systems. In SIGMOD, 2012.

Plattner, C. et al., Extending DBMSs with Satellite Databases. VLDBJ, 2008, pp. 657-682, 17(4).

Quamar, A. et al., SWORD: Scalable Workload-aware Data Placement for Transactional Workloads. In EDBT, 2013.

Rabl, T., Efficiency in Cluster Database Systems. PhD thesis, University of Passau, 2011.

Rubel, P. et al., Fault Tolerant Approaches for Distributed Real-time and Embedded Systems. In MILCOM, IEEE, 2007, pp. 1-8.

Rusu, C. et al., Energy-Efficient Real-Time Heterogeneous Server Clusters. In RTAS, 2006, pp. 418-428.

Sacca, D. et al., Database Partitioning in a Cluster of Processors. ACM Transactions on Database Systems, 1985, pp. 29-56, 10(1).

Scheuermann, P. et al., Data Partitioning and Load Balancing in Parallel Disk Systems. VLDBJ, 1998, pp. 48-66, 7(1).

Schwefel, H.-P. et al. Contemporary Evolution Strategies. In Proceedings of the Third European Conference on Advances in Artificial Life, vol. 929 of Lecture Notes in Computer Science, Berlin, Germany, Springer, 1995, pp. 893-907.

Shankland, S., "Google Spotlights Data Center Inner Workings," May 2008, 14 pages, [Online] [Retrieved on Mar. 14, 2018] Retrieved from the Internet<URL:https://www.cnet.com/news/google-spotlights-data-center-inner-workings/>.

Stonebraker, M. D. et al., MapReduce and Parallel DBMSs: Friends or Foes? CACM, 2010, pp. 64-71, 53(1).

Stonebraker, M. D. et al., C-Store: A Column-oriented DBMS. In VLDB, pp. 553-564. VLDB Endowment, 2005.

Stonebraker, M. D. et al., Mariposa: A Wide-Area Distributed Database System. VLDBJ, 1996, pp. 48-63, 5(1).

Syropoulos, A., Mathematics of Multisets. In WMP, vol. 2235 of Lecture Notes in Computer Science, pp. 347-358, Berlin, Germany, 2001. Springer.

Voß, S., Meta-heuristics: The State of the Art. In ECAI, 2001, pp. 1-23.

Zamanian, E. et al., Locality-aware partitioning in parallel database systems. In SIGMOD, 2015, pp. 17-30.

Bernstein, P. A. et al., 1983. The failure and recovery problem for replicated databases. In Proceedings of the second annual ACM symposium on Principles of distributed computing—PODC '83. ACM Press, New York, New York, USA, pp. 114-122.

Bonifati, A. et al., 2001. Designing data marts for data warehouses. ACM Transactions on Software Engineering and Methodology 10,4 (Oct. 2001), 452-483.

Coulon, C. et al., "Consistency Management for Partial Replication in a High Performance Database Cluster," In 11th International Conference on Parallel and Distributed Systems (ICPADS'05), vol. 1. IEEE, pp. 809-815.

Curino, C. et al., Schism. Proceedings of the VLDB Endowment 3, 1-2 (Sep. 2010), 48-57.

El Abbadi, A. et al., Availability in partitioned replicated databases. In Proceedings of the fifth ACM SIGACT-SIGMOD symposium on Principles of database systems—PODS '86. ACM Press, New York, New York, USA, 1986, pp. 240-251.

Kemme, B. et al., Database Replication. Synthesis Lectures on Data Management 2, Jan. 2010, pp. 1-153.

Navathe, S. et al., Vertical partitioning algorithms for database design. ACM Transactions on Database Systems 9, 4, 1984, pp. 680-710.

Serrano, D. et al., Boosting Database Replication Scalability through Partial Replication and 1-Copy-Snapshot-Isolation. In 13th Pacific Rim International Symposium on Dependable Computing (PRDC 2007), IEEE, 2007, pp. 290-297.

Mukkamala, R. et al., "Design of Partially Replicated Distributed Database Systems: An Integrated Methodology," ACM, 1988, pp. 187-196.

* cited by examiner

TABLE REPLICA ALLOCATION IN A REPLICATED STORAGE SYSTEM

BACKGROUND

Field of Art

This disclosure relates generally to data management, and more specifically to optimizing the allocation of resources in a replicated storage system.

Description of Art

A network system may use a replicated storage system to store a variety of data. The replicated storage system can include one or more storage clusters, where each storage cluster includes one or more computing machines that, in conjunction, store one or more tables containing the data.

Storage clusters in the replicated storage system may be stored in geographically disparate locations so that data can be more easily accessed by components of the network system in different geographic locations. For example, storage clusters may be stored on multiple continents so that queries for data are not delayed by long transit times between different continents. Conventional replicated storage systems may replicate tables, across the storage clusters so that data is more easily available to users of the replicated storage system. However, each table replica requires additional storage by the replicated storage system, and conventional replicated storage systems frequently fail to properly balance data storage resources with the availability of table replicas.

SUMMARY

A replicated storage system allocates replicas of tables to storage clusters to balance the usage of resources in the replicated storage system. The replicated storage system can store a set of tables that contain data associated with a network system (e.g., travel data for a travel coordination system). A replica of each table is stored on at least one storage cluster of the replicated storage system. The storage clusters receive queries from the network system for data stored in the tables, and the storage clusters transmit the requested data to the network systems. In some cases, if a query requests data from more than one table and the storage cluster receiving the query does not contain replicas of the tables, the storage cluster routes the query to a storage cluster that contains the tables identified in the query.

To determine the allocation of tables to storage clusters, the replicated storage system can determine the query load of the stored tables. The query load of a stored table can represent the amount of networking bandwidth resources that is used by queries for data stored in the table. The query load of a stored table can be determined based on the number of queries that request data from the table or the amount of data requested by the queries. The replicated storage system can generate a set of candidate table allocations based on the query loads of the tables stored in the replicated storage system. Each table allocation assigns each table to at least one storage cluster. The candidate table allocations may be generated based on table allocation criteria that require tables to be assigned to storage clusters based on the popularity of the tables (e.g., number of times accessed or frequency of use) or whether the tables are related to other tables. In some embodiments, the table allocation criteria contain a graph that links tables based on whether a query has requested data from both tables. The table allocation criteria may require that tables that are linked together in the graph be stored together on at least one storage cluster.

The replicated storage system can determine resource parameters for each candidate table allocation. Resource parameters for a table allocation describe how the table allocation would use the replicated storage system's resources. For example, the resource parameters may include: the total amount of data stored by the replicated storage system, the variance of the amounts of data stored by each storage cluster, and/or the variance of the query loads of the storage clusters. The replicated storage system can generate a resource usage score for each candidate table allocation based on the resource parameters. In some embodiments, the replicated storage system uses a utility function to generate the resource usage scores, where the utility function may be weighted based on priorities of the resources used by the replicated storage system. The replicated storage system can select or determine a table allocation from the candidate table allocations based on the resource usage scores of the candidate table allocations and can allocate table replicas to the storage clusters based on the selected table allocation.

The systems and methods described herein contain improvements over conventional methods for storing data in storage systems. For example, if a replicated storage system stored a table replica on every storage cluster, the table would be easily available, but may waste storage resources on storing unnecessary replicas of the table. Additionally, ensuring that each table replica contains the same information requires significant engineering, computational, and networking resources. Thus, storing unnecessary replicas can increase the costs of operating the replicated storage system with marginal benefit. The replicated storage system described herein can more effectively balance the usage of different resources available within the replicated storage system than conventional systems, such as the amount of storage or network bandwidth used by the replicated storage system.

DETAILED DESCRIPTION

Example System Environment and Architecture

Figure 1:
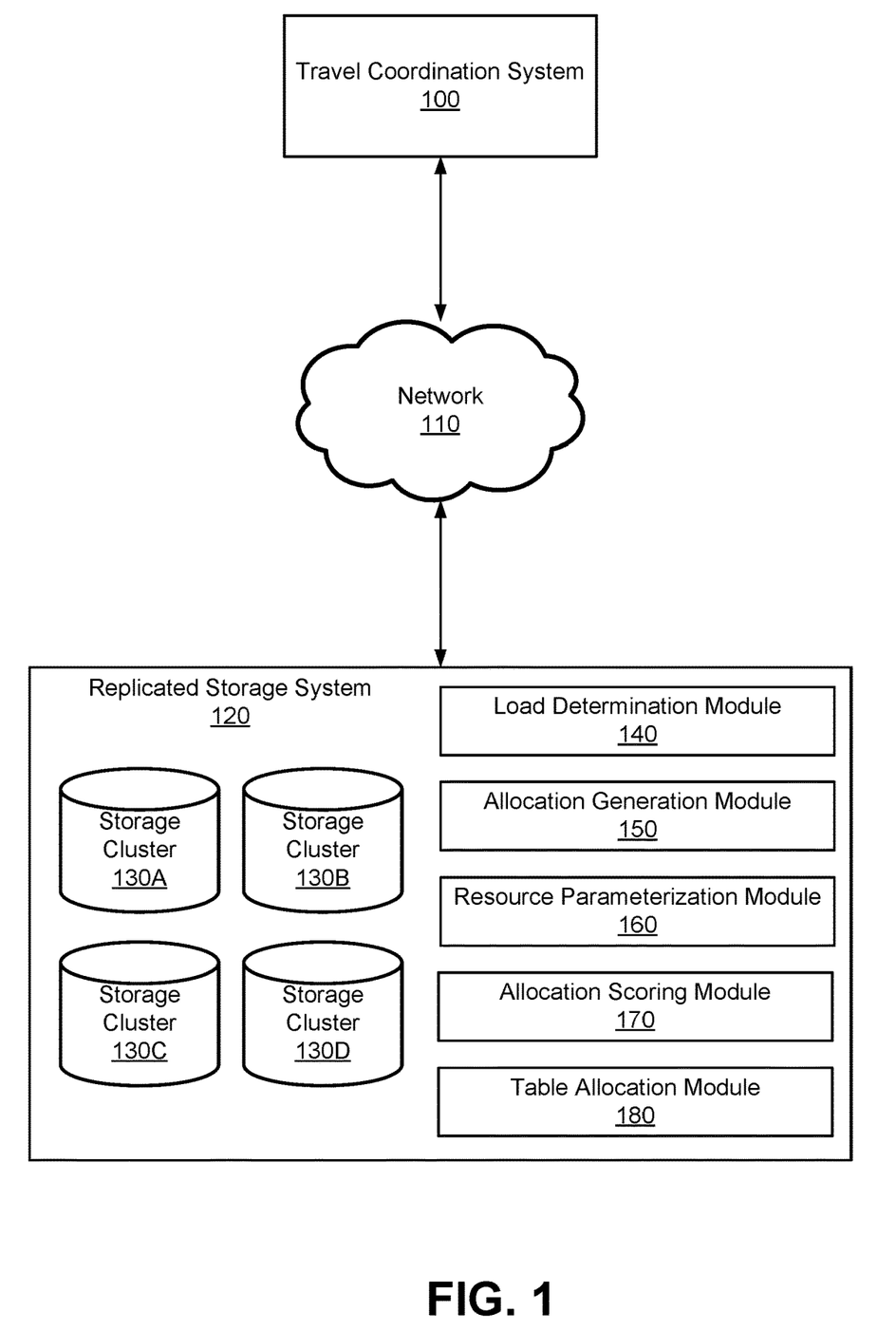
FIG. 1 illustrates an example system environment and architecture for a replicated storage system, in accordance with some embodiments.

FIG. 1 illustrates an example system environment for a replicated storage system 120, in accordance with some embodiments. In the embodiment illustrated in FIG. 1, the system environment includes a network system 100 (or referred to as a travel coordination system 100 in examples herein), a network 110, and a replicated storage system 120.

According to examples herein, the network system 100 can be a set of computing systems (e.g., servers, devices, etc.) that implement a network service for use by individuals, users, customers, etc., through client devices or end user devices over one or more networks. Examples of a network service can include cloud services, messaging services, social networking services, banking services, e-commerce services, gaming services, delivery or travel coordination services, etc., that may use and store an immense amount of data. Alternate embodiments may contain more, fewer, or different components than the embodiment shown in FIG. 1, and the functionality of the components may be divided differently from the description below.

In examples herein, the systems and methods are described in the context of a travel coordination system (e.g., one that arranges delivery or transport services for users) and travel coordination data. However, the replicated storage system 120 may store any kind of data and be accessed by any individual or system communicatively connected to the replicated storage system 120. Furthermore, while the replicated storage system is described as storing tables and table replicas, the systems and methods herein may store data using any kind of structure with relationships between pieces of data. For example, the replicated storage system 120 may store data in graphs, documents, or objects. In some embodiments, the replicated storage system 120 may be part of the travel coordination system, or the system environment may include client devices for users interacting with the travel coordination system and the replicated storage system 120.

The travel coordination system 100 receives requests for trips (e.g., transport or delivery services) from riders and matches the riders with providers who can provide transportation to the rider. The riders and providers can interact with the travel coordination system 100 through a client device. The client device can be a personal or mobile computing device, such as a smartphone, a table, a laptop computer, or a desktop computer. In some embodiments, the user device executes a client application that uses an application programming interface (API) to communicate with the travel coordination system 100. The travel coordination system 100 can receive requests for rides from riders through the client device, and can transmit an assignment to a provider to provide a ride to a requesting rider. The travel coordination system 100 can also provide a map of the geographic region or the current location of the client device to a rider, or can provide routing instructions to a provider through the client device when the provider is providing transportation to a rider.

The travel coordination system 100 stores travel coordination data in the replicated storage system 120. Travel coordination data is data that the travel coordination system 100 uses in its operation. For example, travel coordination data can include user profile information for riders and providers, such as user contact information, preferences, user location information, and/or user status information. Travel coordination data can also include trip data (e.g., trip duration, start and end locations, trip length), traffic data, weather data, accident data, construction data, and trip routing data. Furthermore, travel coordination data can include system data containing events that describe user interactions with the travel coordination system 100. The travel coordination data can also include models or algorithms used by the travel coordination system 100, such as trip request rate models, provider supply models, route determination models, traffic prediction models, weather prediction models, and trip price determination algorithms.

The travel coordination system 100 can communicate with replicated storage system 120 via the network 110, which may comprise any combination of local area and wide area networks employing wired or wireless communication links. In one embodiment, the network 110 uses standard communications technologies and protocols. For example, the network 110 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any format, such as hypertext markup language (HTML) or extensible markup language (XML). In some embodiments, all or some of the communication links of the network 110 may be encrypted.

The replicated storage system 120 stores travel coordination data for the travel coordination system 100. FIG. 1 illustrates an example system architecture for a replicated storage system 120, in accordance with some embodiments. The system architecture illustrated in FIG. 1 includes storage clusters 130A-130D (referred to generally as storage clusters 130), a load determination module 140, an allocation generation module 150, a resource parameterization module 160, an allocation scoring module 170, and a table allocation module 180. Alternate embodiments may include more, fewer, or different components from the embodiment illustrated in FIG. 1, and the functionality of the replicated storage system 120 may be divided between the components differently from the description below. For example, while four storage clusters 130 are illustrated in FIG. 1, this number is for example only and the replicated storage system 120 may include any number of storage clusters 130.

The replicated storage system 120 stores the travel coordination data in the storage clusters 130. Each storage cluster 130 includes one or more computing devices configured to store travel coordination data for the replicated storage system 120. Travel coordination data may be stored in multiple computing devices within a storage cluster 130 to ensure that the travel coordination data is preserved if a computing device fails. Each storage cluster 130 may be geographically located separately from the other storage clusters 130. For example, each storage cluster 130 may be stored on a different continent, or in different parts of the same continent.

The storage clusters 130 store travel coordination data in tables generated by the travel coordination system. Each table can store travel coordination data in entries that contain particular values. For example, a user profile table may contain, in each entry, the user's profile name, the user's email address, and whether the user is a rider or a provider. Storage clusters 130 that store travel coordination data from a particular table store a replica of that table on the computing devices within the storage cluster 130. Replicas of the same table are ideally the same on each storage cluster 130 storing the table (i.e., each replica of a table stores the same entries with the same values as each other replica of the table), though differences between replicas may exist as a change to the table is propagated to the storage clusters 130 storing the table.

The storage clusters 130 receive queries for travel coordination data from the travel coordination system 100 and transmit the requested travel coordination data to the travel coordination system 100. In some embodiments, the travel coordination system 100 includes computer clusters located in geographically separate areas, and each storage cluster 130 receives queries from components of the travel coordination system 100 executed on a computer cluster located nearest the storage cluster 130. Each query may identify a table and an entry within the identified table that contains the requested travel coordination data. The storage cluster 130 receiving the query determines whether it contains a replica of the table identified in the query. If the receiving storage cluster 130 contains a replica of the identified table, the storage cluster 130 transmits the requested travel coordination data to the travel coordination system 100. If the receiving storage cluster 130 does not contain a replica of the identified table, the storage cluster 130 routes the query to a storage cluster 130 with the replica. Each storage cluster may store and use a look-up table to determine which storage cluster 130 stores a replica of the table identified in the query. In some embodiments, a query may identify travel coordination data from more than one table. In these cases, if the storage cluster 130 receiving the query does not contain replicas of the identified tables, the storage cluster 130 may route the query to a storage cluster 130 that does contain replicas of the tables. In some embodiments, queries are received by a central, overarching system that determines which storage clusters 130 contain replicas of tables for a query. This system can direct a query to one or more storage clusters 130 that contain the tables requested by the query.

The storage clusters 130 may store metadata about the storage clusters 130. For example, each storage cluster 130 may store information identifying which tables the storage cluster 130 stores, the amount of storage required for each table replica, and the total amount of storage used by the storage cluster 130. Each storage cluster 130 may also store information about queries received by the storage cluster 130. The query information may include when the query was sent, when the query was received, which tables the query requested travel coordination data from, or the amount of travel coordination data requested.

The load determination module 140 determines the query load of the tables stored in the storage clusters 130. The query load of a table can represent the amount of networking bandwidth resources that is used by queries for travel coordination data stored in the table. The load determination module 140 may receive query information from the storage clusters 130 that describe queries received by the storage clusters 130, and can determine the query load for the table based on the query information. The query load for a table can be a numeric score that represents the average or total number of queries to the replicated storage system 120 for travel coordination data from the table, the average or total size of the travel coordination data requested by queries to the replicated storage system 120, or the rate at which queries request travel coordination data from the table. In some embodiments, the load determination module 140 generates a model of the query load of a table that models queries that request travel coordination data from the table. The query load model may be used to predict the future query load of the table. The load determination module 140 may generate the query load model based on query information about the table, query information about other tables, and the type of travel coordination data stored in the table. The load determination module 140 can also determine the query load of a storage cluster 130.

The allocation generation module 150 generates candidate table allocations of tables to storage clusters. Each candidate table allocation assigns each storage cluster 130 to store replicas for a set of tables. For example, if the replicated storage system 120 stores tables A, B, C, D, and E, a candidate table allocation may assign tables A and B to storage cluster 130A, tables A and B to storage cluster 130B, tables C and D to storage cluster 130C, and table E to storage cluster 130D. Different candidate table allocations may assign the tables to the storage clusters 130 differently.

The allocation generation module 150 may generate the set of candidate table allocations based on table allocation criteria. Table allocation criteria can specify on how many storage clusters a table must be replicated and whether a table must be stored on a storage cluster with another table. To ensure that a popular table can be easily accessible by the travel coordination system 100, the table allocation criteria may require that tables be stored on a minimum number of storage clusters 130. For example, the table allocation criteria may require that each table have a replica stored on at least two storage clusters 130. In some embodiments, the table allocation criteria may establish a minimum number of replicas for a particular table based the popularity of the table. For example, if a table is popular has a high query load, the table allocation criteria may require that more replicas of the table be stored in the storage clusters 130. In some embodiments, the table allocation criteria may include a threshold for a numeric score of the query load for a table to determine whether more than one replica of the table should be stored in the replicated storage system 120. The table allocation criteria include more than one threshold for the query load of a table to determine how many replicas of the table to store in the storage clusters 130. For example, the table allocation criteria may have a first threshold for storing replicas of the table on two storage clusters 130, a second threshold for storing replicas on three storage clusters 130, and so forth.

In some embodiments, the table allocation criteria may also specify that replicas of tables be stored together on the same storage cluster if the tables are related. Two or more tables may be related to one another if queries frequently request travel coordination data from these tables. In some embodiments, the table allocation module 170 generates a relation score between two tables based on query information for the two tables. The table allocation criteria may then use a threshold for the relation score to determine whether to store replicas of the two tables on the same storage cluster 130. The table allocation criteria may require that replicas of related tables always be stored together on storage clusters 130 or may require that replicas of related tables be stored on at least one storage cluster 130. In some embodiments, if a query requests travel coordination data from two tables or more tables, then the table allocation criteria requires that the tables be stored together on at least one storage cluster. The table allocation criteria may store a graph of tables, wherein edges between tables mean that a query has requested travel coordination data from the connected tables. The table allocation criteria may require that all tables with edges between them be stored together on at least one storage cluster.

The resource parameterization module 160 generates resource parameters for each candidate table allocation. Resource parameters are numeric values that describe resource usage by the replicated storage system 120. For example, the resource parameters may include: the total amount of travel coordination data stored by the replicated storage system 120, the variance of the amounts of travel coordination data stored by each storage cluster 130, and the variance of the query loads of the storage clusters 130. The resource parameterization module 160 can generate the resource parameters for a table allocation based on the amount of travel coordination data stored in each storage cluster 130, the amount of travel coordination data stored in a table, or query information. In some embodiments, the resource parameterization module 160 uses one or more models of the tables, the storage clusters 130, or the replicated storage system 120 to determine the resource parameters.

The allocation scoring module 170 generates a resource usage score for each candidate table allocation. The allocation score module 170 can generate the resource usage scores for the candidate table allocations based on a utility function that uses weights for the resource parameters that correspond with the priorities of resources associated with the resource parameters. For example, if a small total size of the replicated storage system 120 is a high priority, then the allocation scoring module 170 may weigh a resource parameter for the total size of the replicated storage system 120 more highly. In some embodiments, the parameter determination module 160 receives the resource parameter weights from developers of the replicated storage system 130. The parameter determination module 160 also may determine or adjust the resource parameter weights based on resource utilization of the replicated storage system 120. If one resource is under-utilized and another resource is over-utilized, the parameter determination module 160 may increase the weight of a resource parameter associated with the over-utilized resource and decrease the weight of a statistic associated with the under-utilized resource. For example, if the query load of the replicated storage system 120 is at 25% of total query capacity and the total storage of the replicated storage system 120 is at 75% of total storage capacity, then the parameter determination module 160 may raise the priority of reducing total storage capacity and lower the priority of reducing variance of query load across the storage clusters 130. In some embodiments, the parameter determination module 160 determines the priorities of resource parameters based on the resource utilization of the storage clusters 130.

The allocation scoring module 170 may evaluate the candidate table allocations using a utility function. The utility function uses the weights of the resource parameters to generate a resource usage score for the candidate table allocations. For example, if $\alpha$ is the weight of the total amount of storage used by the replicated storage system 120 $s$, $\beta$ is the weight of the variance of the amounts of storage used by the storage clusters 130 $c$, and $\gamma$ is the weight of the variance of the query loads of the storage clusters 130 $l$, then the utility function U might be:

$$U(\alpha)=\alpha s_\beta+\beta c_\alpha+\gamma l_\alpha$$

for some candidate table allocation $\alpha$. The discussion herein generally refers to a lower resource usage score as a more optimal resource usage score, though the utility function may be configured such that a higher resource usage score is a more optimal resource usage score. The allocation scoring module 170 can apply the utility function to all candidate table allocations to generate a set of resource usage scores for the candidate table allocations.

The table allocation module 180 allocates tables to the storage clusters 130. The table allocation module 180 selects table allocation with the lowest resource usage score and assigns tables to storage clusters 130 based on the table assignments specified in the table allocation. The table allocation module 180 can send instructions to one or more storage clusters 130 to adjust which tables each storage cluster 130 stores.

In some embodiments, the table allocation module 180 instructs the allocation generation module 150, the resource parameterization module 160, and the allocation scoring module 170 to reassess the allocation of tables in the storage clusters 130. To reassess the allocation of tables in the storage clusters, the table allocation module 180 may instruct the allocation generation module 150 to generate a new set of candidate table allocations, the resource parameterization module 160 to determine the resource parameters of the new set of candidate table allocations, and the allocation scoring module 170 to generate resource usage scores for the new set of candidate table allocations. The table allocation module 180 may reassess the allocation of tables in the storage clusters 130 periodically or in response to certain events, such as the addition of a new table to the replicated storage system 120, the removal of an existing table, or to changes in the query loads of the tables. In some embodiments, the table allocation module 180 compares the current table allocation to the new candidate table allocations and determines whether to use one of the candidate table allocations to reallocate the tables in the replicated storage system 120.

Example Table Allocations to Storage Clusters

Figure 2:
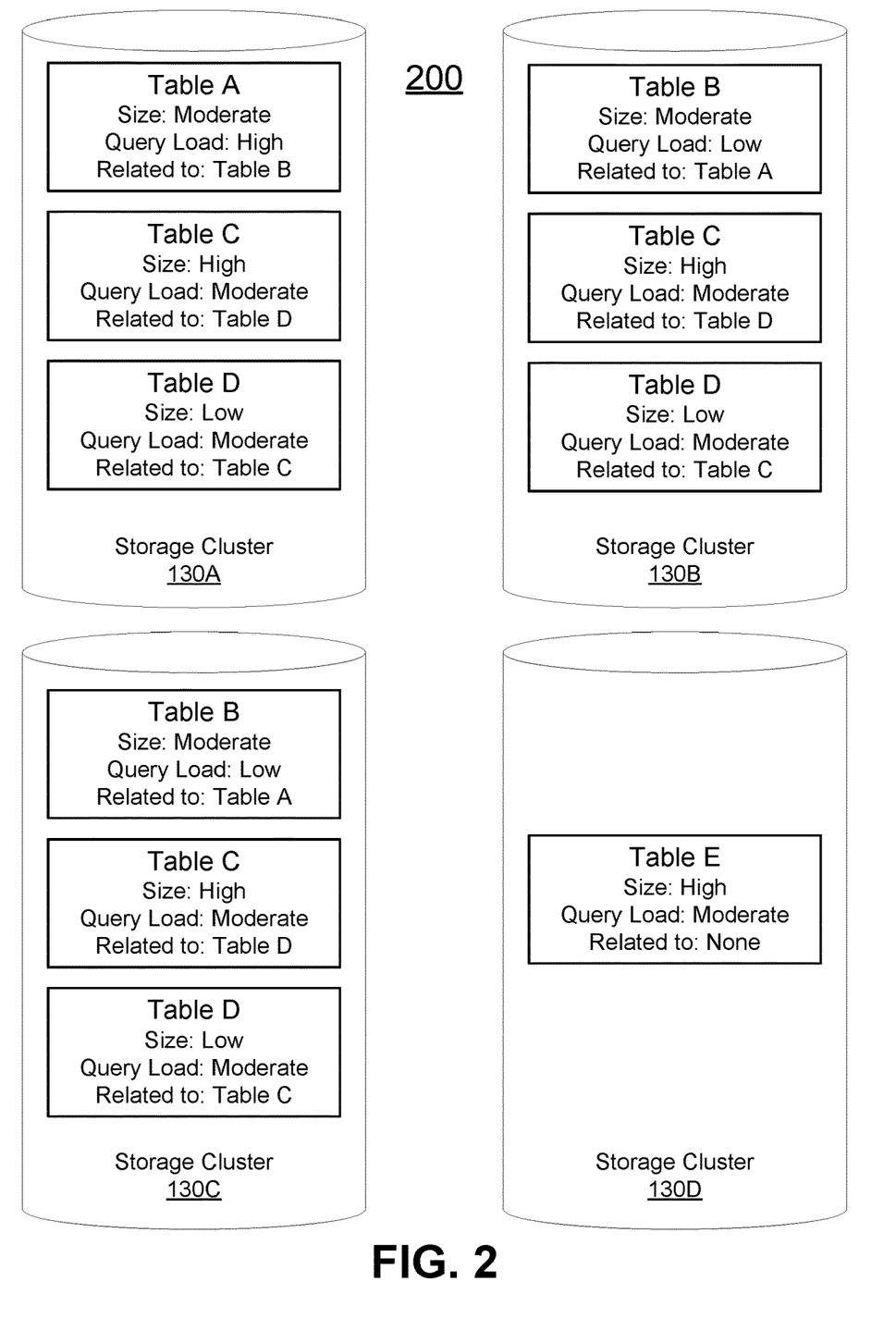
FIG. 2 illustrates a sub-optimal table allocation of tables to storage clusters, in accordance with some embodiments.

FIG. 2 illustrates a sub-optimal table allocation 200 of tables to storage clusters 130, in accordance with some embodiments. In the illustrated table allocation 200: storage cluster 130A is assigned tables A, C, and D; storage cluster 130B is assigned tables B, C, and D; storage cluster 130C is assigned tables B, C, and D; and storage cluster 130D is assigned table E. Each storage cluster 130 stores replicas of the tables assigned to it. For example, storage cluster 130A may store replicas of tables A, C, and D, and storage cluster 130D may only store a replica of table E.

The table allocation 200 is sub-optimal for a number of reasons. First, the table allocation does not meet the table allocation criteria for candidate table allocations. The table allocation criteria may require that tables with high query loads be stored on more than one cluster. Table A has a high query load, but table A is only stored on storage cluster 130A. Thus, replicas of table A are not stored on enough storage clusters 130 to meet the requirements of the table allocation criteria.

Additionally, the travel allocation criteria may require that tables that are related to each other be stored together on at least one storage cluster. Since travel coordination data from tables A and B are typically requested together, table A and table B are related to each other, however none of the storage clusters store replicas of both tables. Thus, any query must be serviced by at least two storage clusters 130, which is inefficient, and the table allocation 200 does not meet the table allocation criteria.

Furthermore, the table allocation 200 has a high resource usage score. Since storage clusters 130A and 130B store four table replicas and storage cluster 130D only stores one, the variance of the amounts of stored travel coordination data among the storage clusters 130 is high. Similarly, since storage cluster 130D only stores table E, the query load of storage cluster 130D is much lower than the others, and thus the variance of the query loads of the storage clusters 130 is higher. Finally, three replicas of tables C and D are stored in the storage clusters 130, which increases the total storage used by the replicated storage system.

Figure 3:
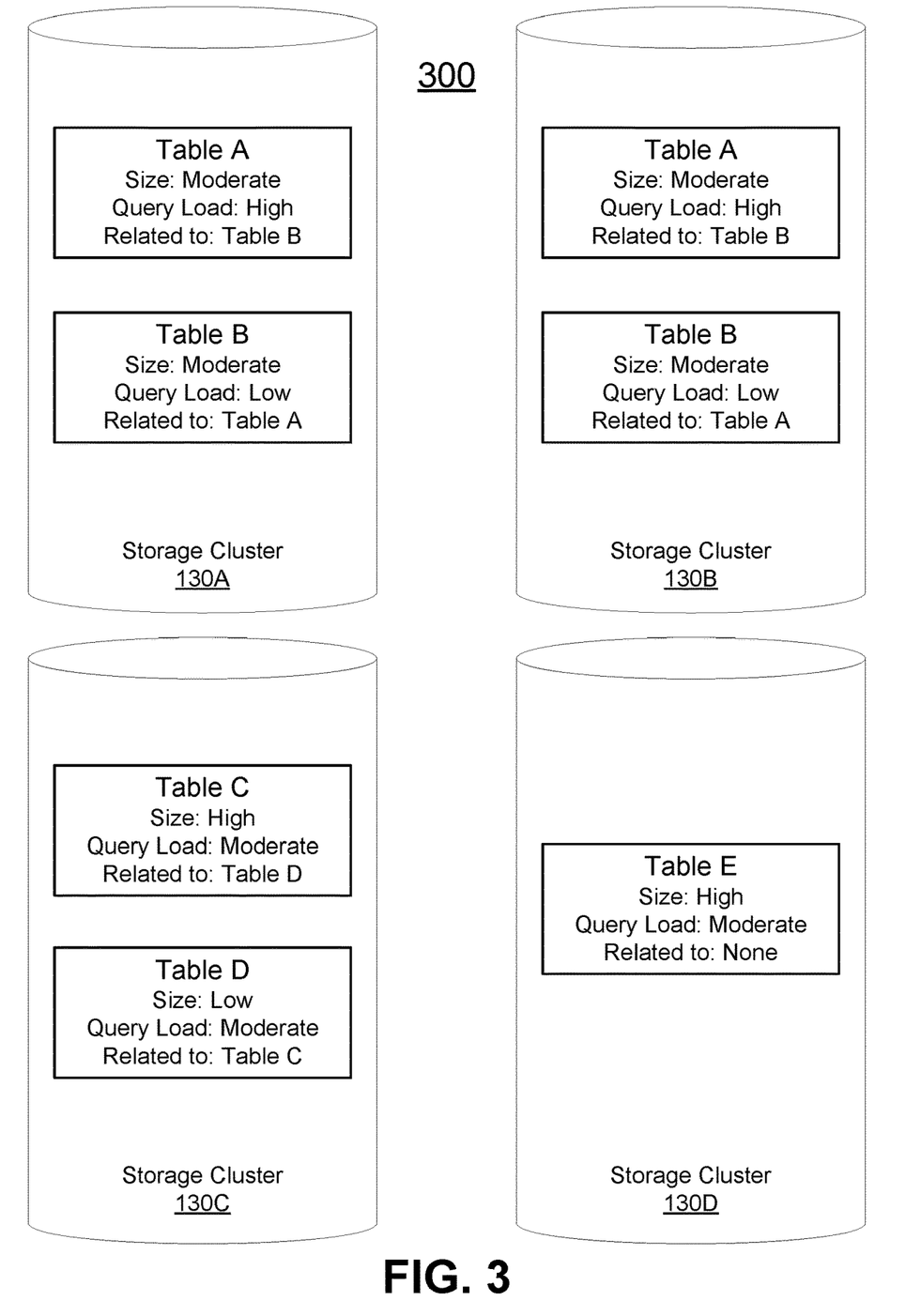
FIG. 3 illustrates a table allocation generated based on the methods described herein, in accordance with some embodiments.

FIG. 3 illustrates a table allocation 300 generated based on the methods described herein, in accordance with some embodiments. The table allocation 300 is more optimal than the table allocation 200 illustrated in FIG. 2. First, the table allocation 300 satisfies the table allocation criteria. The query load of table A is high, and thus table A is stored on two storage clusters: 130A and 130B. Additionally, table A, which is related to table B, is stored at the same storage clusters 130 as table B. Thus, this table allocation meets the table allocation criteria for candidate table allocations.

Additionally, the resource usage score for table allocation 300 is lower than for table allocation 200. The total amount of storage used by the storage clusters 130 is reduced because fewer replicas of the tables are stored overall. Additionally, the storage and query load for each individual storage cluster 130 is more evenly distributed. Thus, the variance of the amounts of storage used by the storage clusters 130 and the variance of the query loads of the storage clusters 130 are reduced. Thus, the resource usage score of table allocation 300 is lower than the resource usage score of table allocation 200.

Allocating Table Replicas to Storage Clusters

Figure 4:
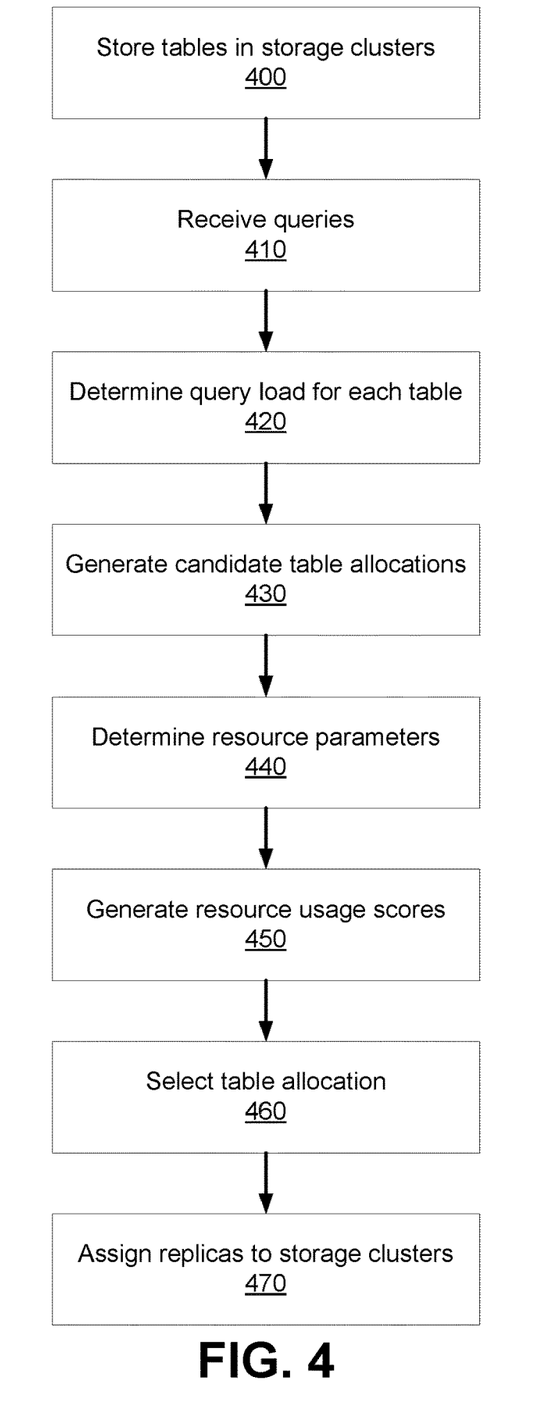
FIG. 4 illustrates a method for allocating replicas of tables in a replicated storage system, in accordance with some embodiments.

FIG. 4 is a flowchart describing a method for assigning table replicas to storage clusters. Alternate embodiments may include more, fewer, or different steps from those described below, and the steps may be performed in a different order from that illustrated in FIG. 4.

A replicated storage system stores 400 tables in storage clusters. A replica of each table may be stored in at least one of the storage clusters. The replicated storage system receives 410 queries from the travel coordination system for travel coordination data stored in the tables. Each query can identify one or more tables from which the travel coordination system is requesting travel coordination data. The replicated storage system may store query information that describes the received queries. For example, the query information may describe the number of queries received by the replicated storage system, the number of queries that identify a table, the amount of data requested by each query, or the rate at which the replicated storage system receives queries. The replicated storage system determines 420 a query load for each table based on the query information. In some embodiments, the replicated storage system determines a numeric score for the query load.

The replicated storage system may reallocate table replicas to storage clusters periodically or in response to an event occurring, such as the addition of a new table or the removal of an old table. To reallocate the table replicas, the replicated storage system generates 430 a set of candidate table allocations that assign each table to one or more storage clusters. The candidate table allocations may be generated based on table allocation criteria that specify how many storage clusters a table with a high query load must be stored on or whether two related tables must be stored together on at least one storage cluster. The replicated storage system determines 440 resource parameters for each candidate table allocation. The resource parameters describe how a candidate table allocation would use the resources of the replicated storage system. For example, the resource parameters may include the total amount of storage used by the replicated storage system, the variance of the amounts of storage used by each storage cluster, or the variance of the query loads of each storage cluster.

The replicated storage system generates 450 a resource usage score for each candidate table allocation. The resource usage score may be generated using a utility function that weighs each resource parameter according to the priorities of resources corresponding to the resource parameters. The replicated storage system selects 460 a table allocation based on the generated resource usage scores and assigns 470 table replicas to the storage clusters in accordance with the selected table allocation.

Example Machine Architecture

Figure 5:
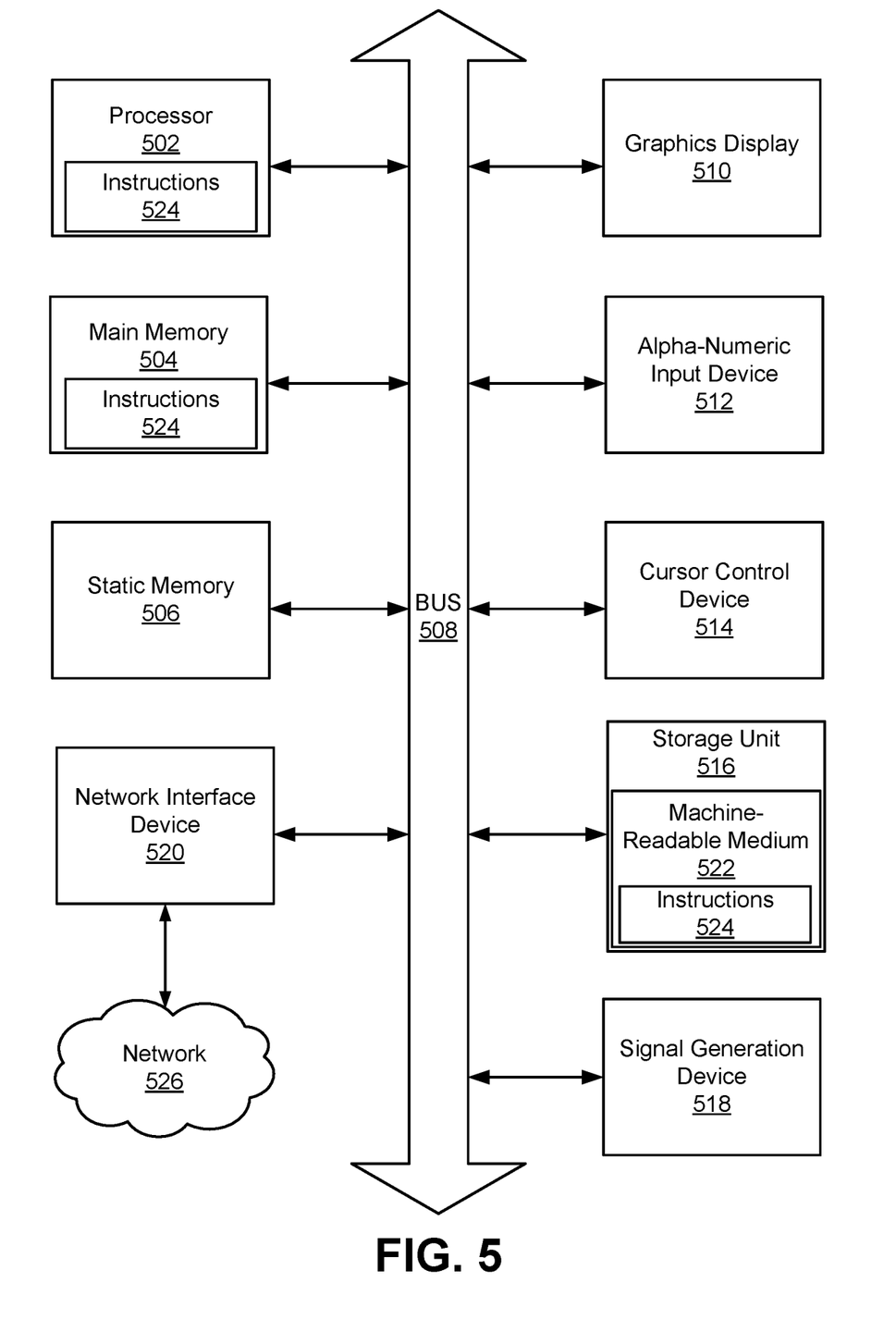
FIG. 5 illustrates an example hardware architecture of a computing device, such as a client device, in accordance with some embodiments.

FIG. 5 is a block diagram illustrating components of an example machine able to read instructions from a machine-readable medium and execute them in a processor (or controller), such as the computing devices that comprise the storage clusters 130. Specifically, FIG. 5 shows a diagrammatic representation of a machine in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 506 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   storing a set of tables in a replicated storage system, the replicated storage system including a plurality of storage clusters, and each table of the set of tables having a replica stored in at least one of the storage clusters; and
   reallocating tables to storage clusters of the replicated storage system periodically or in response to certain events, the reallocation comprising, repeatedly performing:
      receiving a plurality of queries for data stored in the set of tables;
      determining a query load for each table in the set of tables based on the plurality of queries;
      generating a relations score for a pair of tables in the set of tables based on the query loads;
      responsive to the relations score exceeding a threshold included in the table allocation criteria, generating a set of candidate table allocations based on the query loads and table allocation criteria, each candidate table allocation describing an assignment of the set of tables to the plurality of storage clusters, wherein the pair of tables are stored together on at least one storage cluster of the plurality of storage clusters in each candidate table allocation;
      determining resource parameters for each candidate table allocation of the set of table allocations, the resource parameters describing a usage of resources of the replicated storage system of the candidate table allocation;
      generating a resource usage score for each candidate table allocation based on a weighted aggregate of the resource parameters associated with the candidate table allocation, the resource parameters comprising a variance of amounts of storage used by each of the plurality of storage clusters and a variance of query loads of each of the plurality of storage clusters;
      selecting a table allocation from the set of candidate table allocations based on the generated resource usage scores;
      comparing the selected table allocation with a current table allocation to determine whether tables should be reallocated; and
      responsive to determining that the tables should be reallocated, assigning replicas of the set of tables to the plurality of storage clusters in accordance with the selected table allocation.

2. The method of claim 1, wherein the plurality of queries is received from a travel coordination system.

3. The method of claim 1, wherein each query of the plurality of queries identifies data from one or more tables of the set of tables.

4. The method of claim 1, wherein the query loads are represented using a numeric score.

5. The method of claim 1, wherein the query load for a table of the set of tables is determined based on at least one of: a number of the plurality of queries identifying the data from the table, an amount of data requested from the table by the plurality of queries, or a rate at which data is requested from the table.

6. The method of claim 1, wherein generating the set of candidate table allocations based on the query loads and the table allocation criteria comprises:

generating a popularity score for each table in the set of tables based on the query loads; and responsive to the popularity score for a table in the set of tables exceeding a threshold included in the table allocation criteria, generating the set of candidate table allocations such that the table is stored on at least two storage clusters in each candidate table allocation.

7. The method of claim 1, wherein the resource parameters for each candidate table allocation include a total amount of storage used by the replicated storage system using the candidate table allocation.

8. The method of claim 1, wherein generating the resource usage score for each candidate table allocation includes using a utility function based on weights for each resource parameter.

9. The method of claim 1, wherein selecting a table allocation comprises selecting a candidate table allocation with a lowest resource usage score.

10. A non-transitory, computer-readable medium comprising computer-executable instructions that, when executed by a processor, cause the processor to:

store a set of tables in a replicated storage system, the replicated storage system including a plurality of storage clusters, and each table of the set of tables having a replica stored in at least one of the storage clusters; and reallocate tables to storage clusters of the replicated storage system periodically or in response to certain events, the reallocation causing the processor to repeatedly:

receive a plurality of queries for data stored in the set of tables;

determine a query load for each table in the set of tables based on the plurality of queries;

generate a relations score for a pair of tables in the set of tables based on the query loads;

responsive to the relations score exceeding a threshold included in the table allocation criteria, generate a set of candidate table allocations based on the query loads and table allocation criteria, each candidate table allocation describing an assignment of the set of tables to the plurality of storage clusters, wherein the pair of tables are stored together on at least one storage cluster of the plurality of storage clusters in each candidate table allocation;

determine resource parameters for each candidate table allocation of the set of candidate table allocations, the resource parameters describing a usage of resources of the replicated storage system of the candidate table allocation;

for each candidate table allocation, generate a resource usage score based on a weighted aggregate of the resource parameters comprising a variance of amounts of storage used by each of the plurality of storage clusters and a variance of query loads of each of the plurality of storage clusters;

select a table allocation from the set of candidate table allocations based on the generated resource usage scores;

compare the selected table allocation with a current table allocation to determine whether tables should be reallocated; and responsive to determining that the tables should be reallocated, assign replicas of the set of tables to the plurality of storage clusters in accordance with the selected table allocation.

11. The computer-readable medium of claim 10, wherein the plurality of queries is received from a travel coordination system.

12. The computer-readable medium of claim 10, wherein the query load for a table of the set of tables is determined based on at least one of: a number of the plurality of queries identifying the data from the table, an amount of data requested from the table by the plurality of queries, or a rate at which data is requested from the table.

13. The computer-readable medium of claim 10, wherein the instructions for generating the set of candidate table allocations based on the query loads and the table allocation criteria comprise instructions that cause the processor to:

generate a popularity score for each table in the set of tables based on the query loads; and responsive to the popularity score for a table in the set of tables exceeding a threshold included in the table allocation criteria, generate the set of candidate table allocations such that the table is stored on at least two storage clusters in each candidate table allocation.

14. The computer-readable medium of claim 10, wherein the resource parameters for each candidate table allocation include a total amount of storage used by the replicated storage system using the candidate table allocation.

15. A computer system comprising:

a computer processor; and a non-transitory, computer-readable medium comprising computer-executable instructions that, when executed by the computer processor, cause the computer processor to:

store a set of tables in a replicated storage system, the replicated storage system including a plurality of storage clusters, and each table of the set of tables having a replica stored in at least one of the storage clusters; and reallocate tables to storage clusters of the replicated storage system periodically or in response to certain events, the reallocation causing the processor to repeatedly:

receive a plurality of queries for data stored in the set of tables;

determine a query load for each table in the set of tables based on the plurality of queries;

generate a relations score for a pair of tables in the set of tables based on the query loads;

responsive to the relations score exceeding a threshold included in the table allocation criteria, generate a set of candidate table allocations based on the query loads and table allocation criteria, each candidate table allocation describing an assignment of the set of tables to the plurality of storage clusters, wherein the pair of tables are stored together on at least one storage cluster of the plurality of storage clusters in each candidate table allocation;

determine resource parameters for each candidate table allocation of the set of candidate table allocations, the resource parameters describing a usage of resources of the replicated storage system of a candidate table allocation;

for each candidate table allocation, generate a resource usage score based on a weighted aggregate of the resource parameters comprising a variance of amounts of storage used by each of the plurality of storage clusters and a variance of query loads of each of the plurality of storage clusters;

select a table allocation from the set of candidate table allocations based on the generated resource usage scores;

compare the selected table allocation with a current table allocation to determine whether tables should be reallocated; and responsive to determining that the tables should be reallocated, assign replicas of the set of tables to the plurality of storage clusters in accordance with the selected table allocation.

16. The computer system of claim 15, wherein the query load for a table of the set of tables is determined based on at least one of: a number of the plurality of queries identifying the data from the table, an amount of data requested from the table by the plurality of queries, or a rate at which data is requested from the table.

17. The computer system of claim 15, wherein the instructions for generating the set of candidate table allocations based on the query loads and the table allocation criteria comprise instructions that cause the processor to:

generate a popularity score for each table in the set of tables based on the query loads; and responsive to the popularity score for a table in the set of tables exceeding a threshold included in the table allocation criteria, generate the set of candidate table allocations such that the table is stored on at least two storage clusters in each candidate table allocation.

18. The computer-readable medium of claim 10, wherein generating the resource usage score for each candidate table allocation includes using a utility function based on weights for each resource parameter.

19. The computer-readable medium of claim 10, wherein selecting a table allocation comprises selecting a candidate table allocation with a lowest resource usage score.

20. The computer system of claim 15, wherein generating the resource usage score for each candidate table allocation includes using a utility function based on weights for each resource parameter.

* * * * *